United States Patent [19]

Marks

[11] Patent Number: 5,247,053

[45] Date of Patent: Sep. 21, 1993

[54] HALOGENATED COPOLYCARBONATES HAVING IMPROVED END GROUP SELECTIVITY AND RESISTANCE TO DEGRADATION

[75] Inventor: Maurice J. Marks, Lake Jackson, Tex.

[73] Assignee: The Dow Chemical Company, Midland, Mich.

[21] Appl. No.: 820,447

[22] Filed: Jan. 13, 1992

Related U.S. Application Data

[63] Continuation of Ser. No. 477,287, Feb. 8, 1990, Pat. No. 5,081,218.

[51] Int. Cl.$^5$ .................... C08G 64/00; C08G 65/38; C08G 63/00
[52] U.S. Cl. .................... 528/196; 528/190; 528/191; 528/193; 528/201; 528/202; 528/219
[58] Field of Search ............ 528/190, 191, 193, 196, 528/201, 202, 219

[56] References Cited

U.S. PATENT DOCUMENTS

| | | | |
|---|---|---|---|
| 3,028,365 | 4/1962 | Schnell et al. | 528/196 |
| 3,275,601 | 9/1966 | Schnell et al. | 528/196 |
| 3,334,154 | 8/1967 | Kim | 528/191 |
| 3,912,687 | 10/1975 | Haupt et al. | 528/199 |
| 4,075,119 | 2/1978 | Schmidt et al. | 252/182 |
| 4,195,157 | 3/1980 | Mark | 528/174 |
| 4,286,085 | 8/1981 | Jaquiss et al. | 528/199 |
| 4,413,103 | 11/1983 | Katsuhisa et al. | 525/469 |
| 4,430,485 | 2/1984 | Mark | 528/193 |
| 4,440,920 | 4/1984 | Fujikake et al. | 528/128 |
| 4,463,160 | 7/1984 | Mark et al. | 528/176 |
| 4,487,896 | 12/1984 | Mark et al. | 525/439 |
| 4,487,917 | 12/1984 | Mark | 528/196 |
| 4,499,257 | 2/1985 | Maresca | 528/173 |
| 4,506,066 | 3/1985 | Medem et al. | 528/196 |
| 4,621,132 | 11/1986 | Quinn et al. | 528/194 |
| 4,794,156 | 12/1988 | Ho et al. | 528/199 |
| 4,889,911 | 12/1989 | Pielartzik et al. | 528/182 |
| 4,902,758 | 2/1990 | Marks | 525/462 |

FOREIGN PATENT DOCUMENTS

| | | | |
|---|---|---|---|
| 389055 | 9/1990 | European Pat. Off. | 643/2 |
| 2223412 | 10/1974 | France | 17/13 |

OTHER PUBLICATIONS

Chemical Abstracts, vol. 81, No. 22, Dec. 2, 1974, Columbus, Ohio, US.
Abstract No. 136938S, "Fire-resistant Polycarbonate" p. 25; Col. 2.
JP-A-74 35 000 (Idemitsu Kosan Co., Ltd.) Mar. 3, 1974 *abstract**.

*Primary Examiner*—John Kight, III
*Assistant Examiner*—T. Mosley

[57] ABSTRACT

A halogenated copolycarbonate, including a poly(ester/carbonate), which contains reduced levels of phenolic end groups and end groups which result from side reactions of process chemicals with the copolycarbonate chain, has improved resistance to the degradation-inducing effects of such end groups and has improved washability.

13 Claims, No Drawings

HALOGENATED COPOLYCARBONATES HAVING IMPROVED END GROUP SELECTIVITY AND RESISTANCE TO DEGRADATION

This application is a continuation of Ser. No. 07/477,287, filed Feb. 8, 1990, now U.S. Pat. No. 5,081,218.

FIELD OF THE INVENTION

This invention relates to halogenated copolycarbonates, including poly(ester/carbonate)s, which have improved end group selectivity and resistance to degradation.

BACKGROUND OF THE INVENTION

Polycarbonates have found many uses as a class of materials because they combine, in general, a high level of heat and impact resistance, good dimensional stability, and good insulating and non-corrosive properties. Halogenated polycarbonates and copolycarbonates are known especially for resistance to physical deformation at high temperature and resistance to flammability. Various examples of halogenated copolycarbonates, including poly(ester/carbonate)s, are disclosed in the art, and I have found that these known compositions may be differentiated from the halogenated copolycarbonates and poly(ester/carbonate)s of this invention in part by the character of the end groups possessed by the copolycarbonate molecules.

Representative examples of known halogenated copolycarbonates, including poly(ester/carbonate)s, are found, upon analysis, to contain significant amounts of Phenolic End Groups, a Phenolic End Group being an —OH moiety at a copolycarbonate chain end, and/or Process Chemical End Groups, a Process Chemical End Group being the residue yielded at a copolycarbonate chain end by reaction with the copolycarbonate chain of a process chemical, such as a catalyst or other chemical which promotes, directs, regulates or otherwise influences the progress of the copolycarbonate forming reaction.

In addition to containing a significant amount of Phenolic and/or Process Chemical End Groups, analysis also reveals that these representative halogenated copolycarbonates, including poly(ester/carbonate)s, are characterized by a tendency toward thermal degradation, as evidenced by the formation of color bodies upon heating. Further, in the preparation of certain of these representative halogenated copolycarbonates, the reaction mixture is thoroughly emulsified by the time formation of the copolycarbonate product is complete, and several hours are required for the organic phase to separate from the emulsified mixture. It is difficult to readily wash an emulsified product-containing solution thoroughly enough to remove foreign material such as catalysts or inorganic salts, and the performance in a service environment of a product containing such foreign material is frequently impaired.

It would therefore be desirable to provide, and it is an object of this invention to provide, a halogenated copolycarbonate, including a poly(ester/carbonate), possessing an end group selectivity which has greatly reduced Phenolic and Process Chemical End Group content. It would also be desirable to provide a halogenated copolycarbonate, including a poly(ester/carbonate), which has improved resistance to degradation, such as can be caused by exposure to heating, and which possesses good washability.

SUMMARY OF THE INVENTION

In one aspect, this invention involves a wholly aromatic halogenated copolycarbonate, prepared from (i) one or more non-halogenated diphenols described as follows

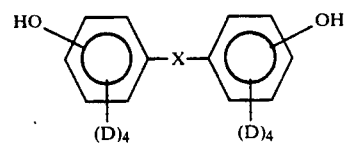

wherein X is a divalent $C_1$–$C_{15}$ alkyl, cyclic or branched hydrocarbon radical, a single bond, —O—, —S—, —$S_2$—, —SO—, —$SO_2$—, or —CO—; and each D is independently hydrogen, or a $C_1$–$C_8$ alkyl, alkoxy, aryl or aryloxy radical, (ii) one or more halogenated diphenols described as follows

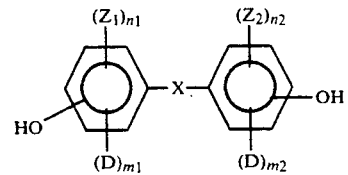

wherein $Z_1$ and $Z_2$ are halo radicals, such as fluoro, chloro, bromo or iodo, and $Z_1$ and $Z_2$ need not be the same; each D is independently hydrogen, or a $C_1$–$C_8$ alkyl, alkoxy, aryl or aryloxy radical; $0 \geq n_1 \leq 4$ and $0 \geq n_2 \leq 4$, although $n_1$ and $n_2$ cannot both equal zero; $m_1 = 4 - n_1$ and $m_2 = 4 - n_2$; and X is as previously defined, and (iii) a carbonate precursor, said halogenated copolycarbonate being characterized by (a) a phenolic end group content of less than about 275 parts per million, and
(b) a content of less than about 90 parts per million of the element of process chemical end groups which is bonded to a copolycarbonate chain end, said process chemical end groups being derived from one or more of the process chemicals selected from the group consisting of a catalyst, a solvent, a base and water.

In another aspect, this invention involves a copolycarbonate as described above characterized by less than 0.5 absorbance units, per mole fraction of halogenated diphenol in the copolycarbonate, when measured on a spectrophotometer at 420 nm after the halogenated copolycarbonate has been heated for thirty minutes at 300° C. and then dissolved in an organic solvent.

In another aspect, this invention involves a halogenated poly(ester/carbonate) which is characterized by (a) a phenolic end group content of less than about 275 parts per million, and
(b) a content of less than about 90 parts per million of the element of process chemical end groups which is bonded to a copolycarbonate chain end, said process chemical end groups being derived from one or more of the process chemicals selected from the group consisting of a catalyst, a solvent, a base and water.

In another aspect, this invention involves a poly(ester/carbonate) characterized by less than 0.5 absorbance units, per mole fraction of halogenated diphenol in the copolycarbonate, when measured on a spectrophotometer at 420 nm after the halogenated copolycarbonate has been heated for thirty minutes at 300° C. and then dissolved in an organic solvent.

The advantages of this invention, among others, are that a halogenated copolycarbonate, including a poly(ester/carbonate), having a favorable end group selectivity, such that both the Phenolic End Group content and the Process Chemical End Group bonded element content are less than the respective values set forth above, has an improved resistance to degradation and has good washability.

The halogenated copolycarbonate, including poly(ester/carbonate), compositions of this invention are useful, for example, for the production of membranes, films, fibers, extruded sheets, multi-layer laminates and molded or shaped articles of virtually every variety, particularly for use in high temperature environments. For example, a halogenated copolycarbonate is frequently molded in the range of 280°-320° C., and the compositions of this invention show superiority stability at those temperatures.

DESCRIPTION OF THE PREFERRED EMBODIMENTS OF THE INVENTION

A halogenated copolycarbonate, including a poly(ester/carbonate), can be prepared in a polycondensation reaction by reacting a non-halogenated dihydroxy compound and a halogenated dihydroxy compound, either together or separately, with a carbonate precursor such as a carbonic acid derivative. When a carbonyl halide such as phosgene is used as the carbonate precursor, phosgene gas is passed into a reaction mixture in which a dihydroxy compound, such as a diphenol, is deprotonated by the presence of a strong base. When the reaction is run in a homogeneous organic solution, a tertiary amine such as pyridine is often used as the base. When the reaction is run in an interfacial system, an alkali or alkaline earth metal hydroxide is frequently used as the base, and an inert organic solvent, such as a chlorinated hydrocarbon, is also added to the reaction mixture to dissolve the carbonate precursor and the polycarbonate product as it forms. A trialkylamine ("TAA"), such as triethylamine, is frequently used to catalyze the polycondensation reaction. The polycarbonate forms at the interface of the aqueous and organic phases as the reaction mixture is agitated. The reaction temperature can be selected freely in as wide a limit as 0°-100° C., but is most advantageously carried out below the boiling point of the solvent, in the range of about 0°-30° C. Solvent removal can be effected by evaporation or by precipitating the polycarbonate product with a non-solvent.

Polycarbonate may also be formed by melt transesterification without a solvent at temperatures of 150°-300° C. using an accelerator such as an alkali or alkaline earth metal or its oxide, or a metal hydroxide or oxide.

When phosgene is used as the carbonate precursor, the initial product of the polycarbonate formation reaction is often a low molecular weight oligomeric diester of the carbonate precursor having chloroformate end groups. These oligomers can be coupled to form a higher weight polycarbonate product. When a halogenated and non-halogenated dihydroxy compound are reacted separately with a carbonate precursor, oligomers formed therefrom can subsequently be coupled to form a halogenated copolycarbonate.

The halogenated copolycarbonate, including poly(ester/carbonate), compositions of this invention are those which are prepared from 90–1 mole percent, and preferably 80–10 mole percent, non-halogenated diphenol, and 10–99 mole percent, and preferably 20–90 mole percent, halogenated diphenol.

Non-halogenated diphenols useful in the preparation of the halogenated copolycarbonates of this invention may be represented by the general formula:

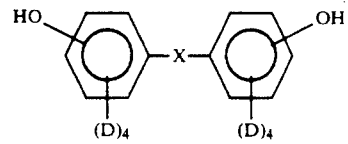

wherein X is a divalent $C_1$–$C_{15}$ alkyl, cyclic or branched hydrocarbon radical, a single bond, —O—, —S—, —$S_2$—, —SO—, —$SO_2$—, or —CO—; and each D is independently hydrogen, or a $C_1$–$C_8$ alkyl, alkoxy, aryl or aryloxy radical. Suitable diphenols include, but are not limited to:
bis(4-hydroxyphenyl)-sulphone,
bis(3-hydroxyphenyl)-sulphone,
bis(2-hydroxyphenyl)-sulphone,
bis(4-hydroxyphenyl)methane,
1,1-bis(4-hydroxyphenyl)-propane,
1,1-bis(4-hydroxyphenyl)-butane,
1,1-bis(4-hydroxyphenyl)-heptane,
2,2-bis(4-hydroxyphenyl)-propane,
1,1-bis(4-hydroxyphenyl)-cyclopentane,
1,1-bis(4-hydroxyphenyl)-cyclohexane; and the like.

Additionally, diphenols having a single or joined aryl rings may be employed in place of the above-mentioned diphenols. Such compounds include, for example, resorcinol, hydroquinone, 1,5-dihydroxynaphthalene, and the like. A preferred non-halogenated diphenol is Bisphenol-A, 2,2-bis(4-hydroxyphenyl)propane.

Halogenated diphenols useful in the preparation of the halogenated copolycarbonates of this invention may be represented by the general formula:

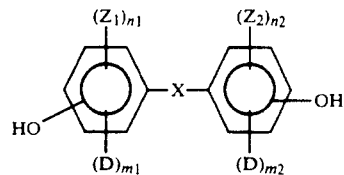

wherein $Z_1$ and $Z_2$ are halo radicals, such as fluoro, chloro, bromo or iodo, and $Z_1$ and $Z_2$ need not be the same; each D is independently hydrogen, or a $C_1$–$C_8$ alkyl, alkoxy, aryl or aryloxy radical; $0 \geq n_1 \leq 4$ and $0 \geq n_2 \leq 4$, although $n_1$ and $n_2$ cannot both equal zero; $m_1 = 4 - n_1$ and $m_2 = 4 - n_2$; and X is as previously defined. Suitable di- and tetrahalogenated diphenols include, but are not limited to:
2,2-bis(4-hydroxy-3-bromophenyl)-propane,
2,2-bis(4-hydroxy-3-chlorophenyl)-propane,
bis(4-hydroxy-3-bromophenyl)-methane,
bis(4-hydroxy-3-chlorophenyl)-methane,
bis(4-hydroxy-3-bromophenyl)-sulphone,
bis(4-hydroxy-3-chlorophenyl)-sulphone,
bis(4-hydroxy-3-bromophenyl)-sulphide,
bis(4-hydroxy-3-chlorophenyl)-sulphide,
1,1-bis(4-hydroxy-3-bromophenyl)cyclohexane, 1,1-bis(4-hydroxy-3-chlorophenyl)cyclohexane,
2,2-bis(4-hydroxy-3,5-dibromophenyl)-propane,
2,2-bis(4-hydroxy-3,5-dichlorophenyl)-propane,
bis(4-hydroxy-3,5-dibromophenyl)-methane,
bis(4-hydroxy-3,5-dibromophenyl)-sulphone,
bis(4-hydroxy-3,5-dibromophenyl)-sulphide,
1,1-bis(4-hydroxy-3,5-dichlorophenyl) cyclohexane,
and the like.

Halogenated diphenols include, in addition to tetrahalogenated diphenols, statistical mixtures of non-, mono-, di-, tri- and tetrahalogenated diphenols. These statistical mixtures may be prepared, for example, by the halogenation of bisphenols as described in U.S. Pat. No. 4,075,119, which is incorporated herein. Additionally, halogenated aryl diols may be employed in place of the above described tetrahalogenated diphenols Such compounds include, for example, 2,3,5,6-tetrabromohydroquinone, 2,3,5,6-tetrachlorohydroquinone, and the like. A preferred tetrahalogenated diphenol is Tetrabromobisphenol-A, 2,2-bis(3,5-dibromo-4-hydroxyphenyl)propane ("TBBA"). A preferred dibrominated diphenol is Dibromobisphenol-A [2,2-bis(4-hydroxy-3-bromophenyl)-propane].

The halogenated copolycarbonates of this invention include those which are formed from more than one non-halogenated dihydroxy compound and/or more than one halogenated dihydroxy compound, blends of two or more different halogenated copolycarbonates, and blends of one or more halogenated copolycarbonates with one or more polycarbonates prepared from non-halogenated diphenols. They also include those halogenated copolycarbonates into which other groups, such as ester or siloxane groups, have been copolymerized, and branched copolycarbonates formed by incorporation of a polyfunctional organic compound, such as trimellitic acid or pyromellitic dianhydride and the like, into the reaction mixture. A poly(ester/carbonate) may be prepared by adding an ester precursor, such as a dicarboxylic acid, to the reaction mixture of the polymerization process as described above.

A preferred method of preparing a halogenated copolycarbonate of this invention involves a sequence of steps wherein diphenol and tetrahalogenated diphenol monomers are phosgenated, in an interfacial mixture of water and a solvent, in order to form diphenol polycarbonate oligomers having chloroformate end groups at a pH of about 12-13, and tetrahalogenated diphenol chloroformate monomers at a pH of about 10-11. During a subsequent step, the chloroformate oligomers and monomers are coupled utilizing an activated pyridine catalyst. Alternatively, diphenol polycarbonate chloroformate oligomers and either tetrahalogenated diphenol chloroformate monomers or oligomers may be prepared by known processes, and thereafter coupled utilizing an activated pyridine catalyst. This process is discussed in greater detail in U.S. Pat. No. 4,902,758, which is incorporated herein.

Activated pyridines which are useful in the preferred method of preparing halogenated copolycarbonates, as described above, include either a pyridine or pyridine salt whose catalytic activity is increased by virtue of having a substituent at the 2 or 4 ring position. Suitable 4-aminopyridines for use according to the present invention are 4-dimethylaminopyridine, 4-pyrrolidinopyridine and poly(N,N-dialkylaminopyridine). Examples of suitable 2-substituted pyridines are methylpyridine, ethylpyridine, isopropylpyridine and polyvinyl pyridine. Activated pyridines having additional alkyl groups, such as those represented by the formulae:

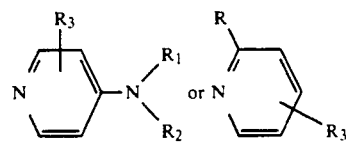

may also be used, where R is a monovalent alkyl radical, a cycloalkyl radical, or a polymer chain such that the formula weight of the catalyst is less than 50,000; $R_1$ and $R_2$ are each independently a monovalent alkyl radical or a polymer chain, such that the formula weight of the catalyst is less than 50,000, or $R_1$ and $R_2$ are $C_1$-$C_8$ alkyl radicals which are joined and, together with N, form a cyclic structure; and $R_3$ is independently hydrogen or a monovalent $C_1$-$C_8$ alkyl radical. A preferred activated pyridine is 4-dimethylaminopyridine.

Catalysts and other process chemicals may also be added to a reaction mixture to promote, direct, regulate or otherwise influence the progress of the reaction by which a halogenated copolycarbonate is formed from its precursor chemicals. Examples of process chemicals in addition to catalysts include solvents, bases, and water. In general, the precursor chemicals include only dihydroxy compound(s), carbonate precursor(s), and other substances, such as a branching agent, which are copolymerizable therewith to form the copolycarbonate chain, as opposed to an end group. When performing the function of catalyzing or otherwise influencing the progress of the copolycarbonate-forming reaction, process chemicals do not react with the copolycarbonate-forming precursors so as to become part of the copolycarbonate molecule. On the contrary, if process chemicals do take part in formation of the copolycarbonate molecule and react with a chloroformate or phenolic-functional reactive site, they become bonded to the copolycarbonate chain and form a Process Chemical End Group. The amount of a Process Chemical End Group in a halogenated copolycarbonate, including a poly(ester/carbonate), can therefore be expressed as the amount of the element of the Process Chemical End Group which is bonded to the copolycarbonate chain. This amount may be expressed, for example, in parts by weight per million parts of halogenated copolycarbonate. A halogenated copolycarbonate may have more than one kind of Process Chemical End Group depending on the extent to which different process chemicals in the reaction mixture react with a copolycarbonate molecule to become bonded to the polymer chain. Methods of reducing formation of Process Chemical End Groups may include adjustment of the type or amount of process chemical(s) used in the reaction or the point of addition thereof to the reaction mixture.

One example of a common Process Chemical End Group derives from the catalyst TAA, which frequently becomes bonded to a halogenated copolycarbonate chain. TAA is often used to facilitate both the coupling of dihydroxy compounds with phosgene and chloroformates, as well as the coupling of bis- and monoesters of a carbonate precursor into higher molecular weight copolycarbonate. TAA forms an intermediate complex with the unesterified portion of a carbonate precursor at a chain end to enhance its reactivity. Rather than just forming such a complex and then splitting off, however, TAA has been found instead, particularly in the formation of halogenated copolycarbonates as opposed to non-halogenated polycarbonates, to displace the leaving group from the carbonyl carbon at the chain end and bond to the carbonyl carbon, forming a carbamate group.

The amount of a Process Chemical End Group in a halogenated copolycarbonate, including a poly(ester/carbonate), can be analyzed by any of several methods, depending on the element or compound to be analyzed. The amount of a Process Chemical End Group which is bonded to the polymer chain through an element not found in the copolycarbonate-forming precursor chemicals can be analyzed by methods such as combustion, titrimetric or photometric techniques. For example, carbamate end groups produced by the reaction of TAA with chloroformates can be quantified by ozonolysis in a nitrogen analyzer. Process Chemical End Groups which are bonded through element(s) also found in the precursor chemicals, such as carbon, can be analyzed by several other methods such as various types of spectroscopy or chromatography, depending on the chemical nature of the Process Chemical End Group radical. In both cases—when the bonded element of a Process Chemical End Group is found in the precursor chemicals and when it is not—the amount of a Process Chemical End Group can be expressed in terms of the amount of the bonded element.

Although a terminator bonds to the copolycarbonate at the end of a chain, it functions as a copolycarbonate-forming precursor, and does not form a Process Chemical End Group. When used, a terminator is added to the reaction mixture to cap the copolycarbonate polymer chain by attack on the unesterified portion of a carbonate precursor such as phosgene. A terminator possesses a single reactive site at which bonding occurs to the carbonyl carbon or oxygen atom closest to the end of a polymer chain. The function of the terminator is therefore to create an inert end group by bonding to the copolycarbonate molecule at a chain end so that no further reaction, and therefore no further chain growth, is possible at that location. Molecular weight is thereby limited to a desired level. A terminator, as described above, is to be distinguished from a process chemical, such as a solvent, base, or catalyst, which, by forming a Process Chemical End Group, has the effect of terminating the copolycarbonate chain in addition to catalyzing or otherwise influencing the progress of the copolycarbonate forming reaction. Phenol and derivatives thereof or other monofunctional substances are representative terminators.

A Phenolic End Group results when a hydroxy moiety on the end of a copolycarbonate, including a poly(ester/carbonate), chain does not react with a carbonate precursor, an ester precursor, or a copolycarbonate-forming intermediate. Phenolic End Group content is reduced in a halogenated copolycarbonate by attaining a high degree of polycondensation in the copolycarbonate-forming reaction. Phenolic End Groups can be quantitatively analyzed by various techniques. The amount of Phenolic End Groups on a non-halogenated dihydroxy residue can be selectively determined in the presence of Phenolic End Groups on a halogenated dihydroxy residue by the titanium chloride colorimetric method described in Horbach et al, *Encyl. Ind. Chem. Anal.*, Vol. 17, pp. 329-352, Krieger, 1973. The amount of Phenolic Phenolic End Groups on a halogenated dihydroxy residue can in turn be selectively determined in the presence of Phenolic End Groups on a non-halogenated dihydroxy residue by spectrophotometric analysis since halogen substituents bonded to phenolic compounds cause a shift in absorbtivity to higher wavelengths compared to non-halogenated phenolic compounds. The amount of Phenolic End Groups can be expressed in parts by weight per million parts of halogenated copolycarbonate.

The halogenated copolycarbonate, including poly(ester/carbonate), compositions of this invention have a high degree of polycondensation, which can be characterized by (a) a Phenolic End Group content of less than about 275 ppm, and (b) a content of less than about 90 ppm of the element(s) of a Process Chemical End Group(s) which is(are) bonded to a copolycarbonate chain end(s).

A variety of problems can result from the presence in a halogenated copolycarbonate, including a poly(ester/carbonate), of Phenolic and/or Process Chemical End Groups at levels exceeding the amounts stated above, the most serious of which is that the end groups promote degradation of a halogenated copolycarbonate in a service environment. A good example of the service stress placed on a halogenated copolycarbonate is thermal aging because halogenated copolycarbonates are frequently processed and used in a high temperature environment. It is found that a halogenated copolycarbonate which contains a significant amount of Phenolic and/or Process Chemical End Groups suffers from heat instability and will form color bodies when subjected to thermal aging. Consequently, one of the particularly desirable features of the halogenated copolycarbonates, including poly(ester/carbonate)s, of this invention is that the content of Phenolic and/or Process Chemical End Groups thereof has been reduced to a level at which the copolycarbonate is heat stable and produces less than about 0.5 absorbance units/mole fraction of halogenated diphenol in the copolycarbonate determined at 420 nm after heating in air at 300° C. for thirty minutes. Such a measurement can be made with a spectrophotometer.

Additionally, Process Chemical End Groups will not, once formed, participate in any further progress of the polycondensation by which the copolycarbonate may grow. A halogenated copolycarbonate, including a poly(ester/carbonate), which contains a significant amount of Process Chemical End Groups will therefore frequently not have undergone polycondensation to an extent sufficient to have an optimally high molecular weight, depending on the use to which the copolycarbonate is to be put.

Other problems which can be associated with the presence of Phenolic and/or Process Chemical End Groups in a halogenated copolycarbonate, including a poly(ester/carbonate), involve washability of the copolycarbonate-forming solution. It is found that Phenolic and/or Process Chemical End Groups are surface active and contribute substantially to the formation of an emulsion during preparation of many copolycarbonate products in an aqueous reaction mixture. A product-containing solution which is emulsified is difficult to readily wash for the purpose of removing from the product foreign material such as inorganic salts, for example $Na_2CO_3$ or NaCl, or catalysts. A halogenated copolycarbonate which contains such foreign materials may display performance deficiencies when subjected to a service environment.

While foreign materials such as inorganic salts or catalysts may be seen as contaminants which should desirably be washed out of a reaction mixture, Phenolic End Groups and Process Chemical End Groups may be seen as impurities which are bonded to the polymer chain itself and are not subject to being washed out of the reaction solution by adjustments to the copolycarbonate formation process. The halogenated copolycarbonates, including poly(ester/carbonate)s, of this invention are therefore improved over those previously known in the art because they are substantially purified of, or are substantially free of, Phenolic End Groups and Process Chemical End Groups, the latter as indicated by reduced amounts of the element of the Process Chemical End Group which is bonded to the copolycarbonate chain. This improved end group selectivity yields one of the important advantages of this invention: a copolycarbonate which has greater resistance to degradation because it is substantially free of the degradation inducing effect of Phenolic and Process Chemical End Groups, such as the thermal degradation mentioned above. The substantial absence of Phenolic and Process Chemical End Groups in the halogenated copolycarbonates of this invention also results in a copolycarbonate which is readily washed free of foreign materials and will typically not suffer a molecular weight deficiency from not having undergone a sufficient degree of polycondensation.

The halogenated copolycarbonates, including poly(ester/carbonate)s, of this invention can further contain conventional thermoplastic polymer additives which include, but are not limited to, fillers, thermal stabilizers, dyes, flame retarding agents, reinforcing agents, softeners, mold-release agents, seed-forming agents, pigments, plasticizers, antistatic agents, UV absorbers, lubricants, compatibilizers, and the like, in conventional amounts generally not exceeding 15%, and preferably not exceeding 5%, by weight of the total composition.

Illustrative Embodiments. To illustrate the practice of this invention, examples of several preferred embodiments are set forth below. It is not intended, however, that these examples (Examples 1 and 2) should in any manner restrict the scope of this invention. Some of the particularly desirable features of this invention may be seen by contrasting the characteristics of Examples 1 and 2 with those of various controlled formulations (Samples A-1 through D) which do not possess the features of, and are not therefore embodiments of, this invention.

Samples A-1 and A-2 are halogenated copolycarbonates prepared by a process substantially representative of those described in Schnell, U.S. Pat. No. 3,275,601. Sample B is substantially representative of the compositions described in Haupt, U.S. Pat. No. 3,912,687. Samples C-1 and C-2 are substantially representative of the compositions described in Jaquiss, U.S. Pat. No. 4,286,085. Sample D is substantially representative of the compositions described in Schnell, U.S. Pat. No. 3,028,365. Comparison of these samples to Examples 1 and 2 illustrates the improvement to be obtained by, for example, adjusting the type or amount of process chemical(s) used in a copolycarbonate-forming reaction or the point of addition thereof to the reaction mixture.

Polycondensations to prepare Samples A-1 through C-2 and Example 2 are performed in a 1 liter resin kettle fitted with a mechanical stirrer, a stirrer baffle, a thermometer, a pH electrode connected to a Fisher Model 650 pH meter/controller, a caustic inlet tube, a phosgene inlet-dip tube, and a gas outlet tube connected to a phosgene scrubber containing 50 wt. % caustic and a small amount of triethylamine. Sodium Hydroxide (50 wt. %) ("caustic") is added from a graduated addition funnel by a Masterflex pump connected to the pH controller through a relay switch. Phosgene is added from a 5 lb. cylinder through a gas flowmeter. The mass of phosgene added is determined from the cylinder weight loss using a Flex-weigh Corp. balance. The reactor and solvents are thoroughly purged with $N_2$ prior to phosgenation. The stirrer is held at 800–1000 rpm during the reaction. The reactor is immersed in an ice bath to maintain an internal temperature of 30° C. or below.

The specific procedures by which Samples A-1 through D and Examples 1 and 2 are prepared are as follows:

Sample A-1. To the reactor fitted as described above is added 14.8 g. (0.0648 mole) Bisphenol-A ("BA"), 35.2 g. (0.0648 mole) Tetrabromobisphenol-A ("TBBA"), 0.27 g. (0.0026 mole) 90% phenol, 315 ml deionized water, 175 ml dichloromethane, and 13 ml (21 g., 0.26 mole) 50 wt. % aqueous NaOH ("caustic"). Phosgene (13 g., 0.13 mole, 1 mole/mole comonomers) is added at about 1 g./min. with rapid stirring while 18 ml caustic is added to maintain a pH of about 12.5. Then 4 g. phosgene is added to reduce the pH to 10, followed by 5 g. additional phosgene at pH 10 and 5 ml caustic. The stirrer is turned down and 2 ml caustic is added to increase the pH to 12.5, followed by 325 ml dichloromethane and 0.09 ml (0.07 g., 0.0006 mole, 0.5 mole %) triethylamine ("TEA"). The stirrer is adjusted to about 1000 rpm. After 1 hr. the polymerization is incomplete, and over the course of 3 hr. a total 1.08 ml (0.76 g., 0.0075 mole, 6 mole %) TEA, and 7 ml caustic added to maintain a pH of 12.5, are required to complete the coupling. Phosgene (8 g.) is added to reduce the pH to about 7 and 1N HCl is added to neutralize inorganic carbonates. The resulting mixture is completely emulsified and is allowed to stand 18 hr. to separate. The polymer solution is washed with 1N HCl and repeatedly with water to remove catalyst and salts. The polymer is isolated by flashing the dichloromethane solvent in hot water.

Sample A-2. To the reactor fitted as described above is added 19.8 g. (0.0866 mole) BA, 23.6 g. (0.0433 mole) TBBA, 0.68 g. (0.0045 mole, 3.5 mole %) p-tert.-butylphenol ("PTBP"), 315 ml deionized water, 175 ml dichloromethane, and 13 ml (21 g., 0.26 mole) caustic. Phosgene (13 g., 0.13 mole, 1.0 mole/mole comonomers) is added at about 1 g./min. with rapid stirring while 5 ml caustic is added to maintain a pH of about 12.5. Then 4 g. phosgene is added to reduce the pH to 10, followed by 6 g. additional phosgene at pH 10 and 3 ml caustic. The stirrer is turned down and 3 ml caustic is added to increase the pH to 12.5, followed by 325 ml dichloromethane and 0.54 ml (0.39 g., 0.0039 mole, 3 mole %) TEA. The stirrer is adjusted to about 1000 rpm and after 15 min. the polymerization remained incomplete. A total of 0.44 ml of TEA is added over the course of one hour to complete the reaction. The pH of the aqueous phase is reduced to 9 with addition of 9 g. phosgene, the organic and aqueous phases separated, and the aqueous phase is removed. The polymer solution is washed with 1N HCl and repeatedly with water to remove catalyst and salts. The polymer is isolated by flashing the dichloromethane solvent in hot water.

Sample B. To a reactor fitted as described above is added 14.8 g. (0.0648 mole) BA, 35.2 g. (0.0648 mole)

TBBA, 0.27 g. (0.0018 mole, 1.4 mole %) PTBP, 0.98 g. (0.0097 mole, 7.5 mole %) TEA, 357 ml water, and 438 ml dichloromethane. The pH of the mixture is adjusted to about 8 with caustic and 30 g. (0.3 mole, 2.34 mole/mole TBBA) with 37 ml caustic to maintain a pH of 8 are added. Then 22 ml of caustic is added to increase the pH to about 13.5 which completed the coupling in 60 min. The resulting emulsified mixture is allowed to stand 18 hr. to separate. The pH of the mixture is reduced to 9 with addition of 11 g. phosgene. The aqueous phase is removed and the polymer solution is washed with 1N HCl and with water until neutral. A film sample is obtained for analysis.

Sample C-1. To a reactor fitted as described above is added 16.9 g. (0.074 mole) BA, 40.1 g. (0.074 mole) TBBA, 0.31 g. 90% phenol (0.28 g., 0.003 mole, 2.0 mole % phenol), 0.36 g. (0.003 mole, 2 mole %) 4-N,N-dimethylaminopyridine ("DMAP"), 57 ml water, and 246 ml dichloromethane. The aqueous phase pH is adjusted and held at 9 with caustic and 12 g. (0.12 mole, 0.82 mole/mole monomer) phosgene is added. Then 320 ml dichloromethane is added, the pH is increased and held at 11 with caustic, and 4 g. (0.04 mole, 0.27 mole/mole monomer) phosgene is introduced. The resulting organic/aqueous emulsion is allowed to stand 18 hr. to separate. The aqueous phase is removed and the polymer solution is washed as described above. A film sample is obtained for analysis.

Sample C-2. The reaction as described above to prepare Sample C-1 is repeated using 15.2 g. (0.0666 mole) BA, 18.1 g. (0.0333 mole) TBBA, 0.53 g. (0.0035 mole, 3.5 mole %) p-tert.-butylphenol ("PTBP"), and 0.26 g. (0.0021 mole, 0.5 mole %) DMAP. After the phosgene addition is completed and no chloroformates are detected the polymer solution separated well and is washed. The polymer is isolated by flashing the dichloromethane solvent in hot water.

Sample D. A 5 L 4-neck roundbottom flask equipped with a thermometer, condenser, $COCl_2$/$N_2$ inlet, and a paddle stirrer connected to a Cole Parmer servodyne is charged with BA (105.54 g, 0.462 mol) TBBA (251.45 g, 0.462 mol), 4-tertbutylphenol (2.78 g, 18.5 mmol, 2.0 mol % based on diols), pyridine (190.0 g, 2.402 mol), and $CH_2Cl_2$ (3.0 L). The mixture is stirred at 250 rpm with a slow $N_2$ purge as 91.4g of $COCl_2$ is bubbled in over 51 min. while maintaining the reactor temperature at 21°-23° C. An additional 1.0 g of $COCl_2$ (0.934 mol total) is then added slowly over 8 min. The reaction mixture is worked up by adding $CH_3OH$ (5 mL) and then 3N HCl (0.36 L). After stirring for 15 min., the mixture is poured into a 4 L separatory funnel. The $CH_2Cl_2$ layer is separated and washed further with 0.5N HCl (0.5), water (0.5 L), and is then passed through a column of MSC-1-H ion exchange resin (0.5 L bed volume). The copolymer is isolated by adding 0.9 L of this $CH_2Cl_2$ solution to a mixture of 2.2 L hexane and 1.4 L acetone in an explosion resistant blender. The product is filtered, dried in a hood overnight, ground in a Wiley mill, and then dried for 48 hr. in a vacuum oven at 120° C.

Example 1. The reactor is charged with 38.07 g. (0.07 mole) TBBA, 15.98 g. (0.07 mole) BA, 0.29 g. 90% phenol (0.26 g. phenol, 0.0028 mole, 2.0 mole % of monomers), 300 ml of methylene chloride ("MC"), and 400 ml of de-ionized water ("DIW"). The pH of the mixture is increased to 12.5 by addition of caustic with stirring under $N_2$. With rapid stirring, phosgene (30 g., 0.30 mole) is added at about 1 g./min. while a pH of 12.5 is maintained by caustic addition. The pH is then decreased to 10 with phosgene and 2 g. of additional phosgene is introduced. The aqueous phase tested free of monomers. The pH is increased to 12.5 with caustic and 0.04 g. ($3.04 \times 10^{-4}$ mole, 0.217 mole %) DMAP and 100 ml MC are added. The stirrer is adjusted as the viscosity of the reaction mixture increased. The pH of the mixture is maintained between 12 and 13, as indicated by pH paper, by addition of caustic. After 15 min. copolymer formation is complete; no chloroformate is detected in the organic phase. The aqueous phase is neutralized with phosgene and the organic solution degassed ($CO_2$). The aqueous phase is removed by suction and the organic layer is washed once with dilute (about 1%) HCl and four times with DIW. The polymer solution is transferred to a separatory funnel for further phase separation.

Example 2. To the reactor fitted as described above is added 26.1 g. (0.1142 mole) BA, 31.2 g. (0.0573 mole) TBBA, 0.90 g. (0.0060 mole, 3.5 mole %) p-tert.-butylphenol ("PTBP"), 315 ml deionized water, 175 ml dichloromethane, and 18 ml (28 g., 0.35 mole) caustic. Phosgene (22 g., 0.23 mole, 1.3 mole/mole comonomers) is added at about 1 g./min. with rapid stirring while 17 ml caustic is added to maintain a pH of about 12.5. Then 4 g. phosgene is added to reduce the pH to 10, followed by 4 g. additional phosgene at pH 10 and 12 ml caustic. The stirrer is turned down and 4 ml caustic is added to increase the pH to 12.5, followed by 325 ml dichloromethane and 0.10 g. (0.0009 mole, 0.5 mole %) 4-N,N-dimethylaminopyridine ("DMAP"). The stirrer is adjusted to about 1000 rpm and after about 6 min. the polymerization is complete. The pH of the aqueous phase is reduced to 9 with addition of 4 g. phosgene, the organic and aqueous phases rapidly separated, and the aqueous phase is removed. The polymer solution is washed with 1N HCl and repeatedly with water to remove catalyst and salts. The polymer is isolated by flashing the dichloromethane solvent in hot water.

Analytical measurements were made to contrast Samples A-1 through D with Examples 1 and 2 and are summarized in Table I. Molecular weight determinations are done by gel permeation chromatography ("GPC") using a Bisphenol-A polycarbonate standard. Bisphenol-A Phenolic End Groups ("BA-OH") are measured by the titanium chloride colorimetric method described in Horbach et al, *Encyl. Ind. Chem. Anal.*, Vol. 17, pp. 329-352, Krieger, 1973. Tetrabromobisphenol-A Phenolic End Groups ("TBBA-OH") are measured using GPC from the total polymer absorbance at 295 nm, calibrated against TBBA.

Nitrogen analysis to detect the formation of Process Chemical End Groups by bonding of a TEA or DMAP residue to a copolycarbonate chain is performed using an Antek Model 720 nitrogen detector, which measured total non-volatile polymer nitrogen content.

Formation of color bodies is determined by placing 0.25 g. of each of the above copolycarbonates in a glass jar into a oven held at 300° C. for 30 minutes. The test specimen is allowed to cool and dissolved in 10 ml dichloromethane. The total absorbance of these solutions at 420 nm is recorded using an Hewlett Packard Model 8451A Diode Array Spectrophotometer.

In Table I, "Mw" is weight-average molecular weight; "Mn" is number-average molecular weight; "BA-OH ppm" is the content of Phenolic End Groups located on the residue of a Bisphenol-A molecule in parts per million ("ppm"); "TBBA-OH ppm" is the content of Phenolic End Groups located on the residue of a Tetrabromobisphenol-A molecule in ppm; "-OH Total ppm" is the total content of Phenolic End Groups in the specimen of copolycarbonate in ppm; "N. ppm" is the total content of the element of the Process Chemical End Groups bonded to the copolycarbonate chain in the specimen of copolycarbonate in ppm, determined in this instance as the nitrogen content derived from the bonding of a TEA or DMAP residue to a copolycarbonate chain; "Total Absn." is the number of absorbance units registered on a spectrophotometer at 420 nm due to formation of color bodies by the specimen; and "Total Absn./X(TBBA)" is the number of absorbance units divided by the mole fraction of TBBA present in the specimen.

TABLE I

Results of Analysis of Samples A-1 through D and Examples 1 and 2

|  | Mw | Mn | Ba—OH ppm | TBBA—OH ppm | —OH Total ppm | N. ppm | Total Absn. | Total Absn./ X(TBBA) |
|---|---|---|---|---|---|---|---|---|
| Sample A-1 | 42,731 | 11,627 | 22 | 174 | 196 | 98 | 0.4028 | 0.81 |
| Sample A-2 | 29,678 | 10,904 | 45 | 164 | 209 | 144 | 0.6644 | 2.01 |
| Sample B | 45,591 | 15,978 | 21 | 156 | 177 | 283 | 1.2195 | 2.44 |
| Sample C-1 | 42,891 | 11,527 | 305 | 591 | 896 | 12 | 0.5934 | 1.19 |
| Sample C-2 | 25,374 | 8,196 | 104 | 177 | 281 | 10 | 0.3025 | 0.92 |
| Sample D | 44.027 | 18,888 | 52 | 456 | 508 | 9 | 0.2667 ±0.0226 | 0.53 |
| Example 1 | 47,042 | 14,378 | 55 | 83 | 138 | 24 | 0.1432 ±0.0336 | 0.29 |
| Example 2 | 29,328 | 11,886 | 48 | 116 | 164 | 21 | 0.0771 | 0.24 |

The results displayed in Table I show that Samples A-1 through D, which substantially correspond to various halogenated copolycarbonates as disclosed by the prior art, all have either a Phenolic End Group content which exceeds 275 ppm or a Process Chemical End Group bonded element content which exceeds 90 ppm (as measured by nitrogen content derived from either TEA or DMAP), or both. These prior art compositions do not therefore have the improved end group selectivity of Examples 1 and 2, which are embodiments of this invention and have a content of both Phenolic End Groups and Process Chemical End Group bonded element which is below the respective specified maximum amounts. The improved resistance to degradation of the compositions of this invention, and in particular the improved resistance to thermal aging, can be seen in the much lower absorption units/mole fraction readings for Examples 1 and 2, both of which are less than 0.5, as compared to those for Samples A-1 through D. In a corresponding manner, poly(ester/carbonate)s having a Phenolic End Group content and a Process Chemical End Group bonded element content characteristic of the copolycarbonates of this invention also possess an improved resistance to degradation as compared with poly(ester/carbonate)s of the prior art, such as those mentioned in Jaquiss, U.S. Pat. No. 4,286,085.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. Wholly aromatic halogenated copolycarbonate, prepared from a reaction mixture consisting of (i) one or more non-halogenated diphenols described as follows

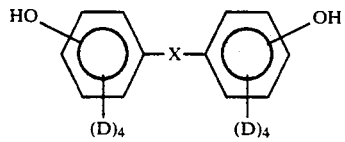

wherein X is a divalent $C_1$-$C_{15}$ alkyl, cyclic or branched hydrocarbon radical, a single bond, —O—, —S—, —$S_2$—, —SO—, —$SO_2$—, or —CO—; and each D is independently hydrogen, or a $C_1$-$C_8$ alkyl, alkoxy, aryl or aryloxy radical, (ii) one or more halogenated diphenols described as follows

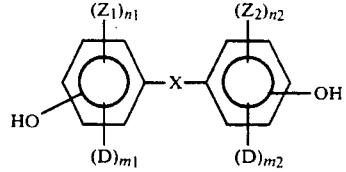

wherein $Z_1$ and $Z_2$ are the same or different halo radicals; each D is independently hydrogen, or a $C_1$-$C_8$ alkyl, alkoxy, aryl or aryloxy radical; $0 \geq n_1 \leq 4$ and $0 \geq n_2 \leq 4$, provided that if $n_1$ equals zero, $n_2$ does not equal zero, and if $n_2$ equals zero, $n_1$ does not equal zero; $m_1 = 4 - n_1$ and $m_2 = 4 - n_2$; and X is as previously defined, (iii) a carbonate precursor, and (iv) water, base and an organic solvent, said halogenated copolycarbonate having (a) a phenolic end group content of less than about 275 parts per million, and (b) a content of less than about 90 parts per million of the element of process chemical end groups which is bonded to a copolycarbonate chain end, said process chemical end groups being derived from one or more of the process chemicals selected from the group consisting of a catalyst, a solvent, a base and water.

2. The halogenated copolycarbonate of claim 1 in which an element of a process chemical end group present in the halogenated copolycarbonate, which is bonded to a copolycarbonate chain end, is not present in the copolycarbonate-forming precursor chemicals.

3. The halogenated copolycarbonate of claim 2 wherein said element of a process chemical end group which is bonded to a copolycarbonate chain end is nitrogen.

4. The halogenated copolycarbonate of claim 3 wherein nitrogen in said process chemical end group is derived from a tertiary amine.

5. The halogenated copolycarbonate of claim 1 which produces less than 0.5 absorbance units, per mole fraction of halogenated diphenol in the copolycarbonate, when measured on a spectrophotometer at 420 nm after the halogenated copolycarbonate has been heated for thirty minutes at 300° C. and then dissolved in an organic solvent.

6. The halogenated copolycarbonate of claim 5 wherein the organic solvent is methylene chloride, and the absorbance is measured when the halogenated copolycarbonate is at a concentration of 0.025 grams/milliliter in said solvent.

7. The halogenated copolycarbonate of claim 1 in the form of a molded article.

8. The halogenated copolycarbonate of claim 1 blended with one or more members of the group consisting of different halogenated copolycarbonates and polycarbonates prepared wholly from non-halogenated diphenols.

9. Wholly aromatic halogenated copolycarbonate, which is prepared from a reaction mixture consisting of (i) one or more non-halogenated diphenols described as follows

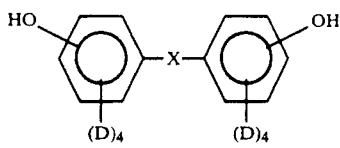

wherein X is a divalent $C_1$–$C_{15}$ alkyl, cyclic or branched hydrocarbon radical, a single bond, —O—, —S—, —$S_2$—, —SO—, —$SO_2$—, or —CO—; and each D is independently hydrogen, or a $C_1$–$C_8$ alkyl, alkoxy, aryl or aryloxy radical, (ii) one or more halogenated diphenols described as follows

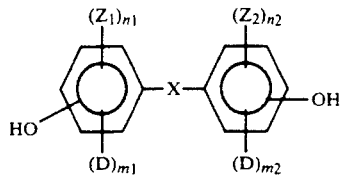

wherein $Z_1$ and $Z_2$ are the same or different halo radicals; each D is independently hydrogen, or a $C_1$–$C_8$ alkyl, alkoxy, aryl or aryloxy radical; $0 \geq n_1 \leq 4$ and $0 \geq n_2 \leq 4$, provided that if $n_1$ equals zero, $n_2$ does not equal zero, and if $n_2$ equals zero, $n_1$ does not equal zero; $m_1 = 4 - n_1$ and $m_2 = 4 - n_2$; and X is as previously defined, (iii) a carbonate precursor, and (iv) water, base and an organic solvent, said halogenated copolycarbonate (a) containing process chemical end groups bonded through nitrogen to a copolycarbonate chain end, said process chemical end groups being derived from one or more of the process chemicals selected from the group consisting of a catalyst, a solvent, a base and water; and (b) producing less than about 0.5 absorbance units, per mole fraction of halogenated diphenol in the copolycarbonate, when measured on a spectrophotometer at 420 nm after the halogenated copolycarbonate has been heated for thirty minutes at 300° C. and then dissolved in an organic solvent.

10. The halogenated copolycarbonate of claim 9 wherein the organic solvent is methylene chloride, and the absorbance is measured when the halogenated copolycarbonate is at a concentration of 0.025 grams/milliliter in said solvent.

11. The halogenated copolycarbonate of claim 9 which is prepared by use of a nitrogen-containing catalyst.

12. The halogenated copolycarbonate of claim 11 wherein the nitrogen-containing catalyst is a tertiary amine.

13. The halogenated copolycarbonate of claim 12 wherein the tertiary amine catalyst is 4-dimethylaminopyridine.

* * * * *